United States Patent [19]

Cook

[11] Patent Number: 4,494,023
[45] Date of Patent: Jan. 15, 1985

[54] MAGNETIC MOTOR MACHINE
[76] Inventor: Raymond Cook, Box 2A, Basin, W. Va. 24727
[21] Appl. No.: 555,413
[22] Filed: Nov. 28, 1983

Related U.S. Application Data

[63] Continuation of Ser. No. 330,522, Dec. 14, 1981, abandoned.
[51] Int. Cl.³ .............................................. H02K 7/00
[52] U.S. Cl. ........................................ 310/21; 310/22; 310/32
[58] Field of Search .................... 310/21, 22, 32, 33, 310/36–39

[56] References Cited

U.S. PATENT DOCUMENTS 1,678,397  7/1928  Koenig ................................. 310/21
4,016,439  4/1977  Sheridan ............................... 310/39

FOREIGN PATENT DOCUMENTS 550249  12/1942  United Kingdom ................. 310/32

Primary Examiner—Donovan F. Duggan
Attorney, Agent, or Firm—Sughrue, Mion, Zinn, Macpeak and Seas

[57] ABSTRACT

A magnetic motor machine is provided in a compact housing and comprises a pair of electromagnetics rigidly attached within said housing in spaced apart relationship. Electronic circuits and power supplies are provided for each of said electromagnetics. The electronic circuits and power supplies have turn-on switches as well as a micro switch which, upon activation of same, alternatively makes and breaks the circuits for each of the electromagnetics. A yoke is positioned between the electromagnetics by a support shaft which is mounted on a bearing for movement thereabout.

2 Claims, 2 Drawing Figures

MAGNETIC MOTOR MACHINE

This application is a continuation of application Ser. No. 330,522, filed 12/14/81, now abandoned.

BACKGROUND OF THE INVENTION

1. Field of the Invention

This invention relates to a magnetic motor machine having an output power take-off means which may be used to power any type of machinery.

2. Statement of the Prior Art

The prior art disclose switching mechanisms of the electromagnetic type for operating various devices. U.S. Pat. Nos. 1,705,518; 2,274,558; and 717,015 are representative of such patents. U.S. Pat. Nos. 2,515,077; 2,802,079; 3,204,220; and 3,439,300 show other switching devices for use on such devices and flashers, vibrators and the like.

These switches do not disclose a yoke reciprocated between a pair of electromagnetics and having shafts to which is connected a power take-off mechanism whereby various machinery may be operated.

SUMMARY OF THE INVENTION

The magnetic motor machine of the present invention comprises a pair of spaced apart electromagnetics mounted on rigid supports such as the opposite walls of a housing. A yoke is supported between the electromagnetics by a shaft, the end of which is pivotably attached to a suitable support bearing within the housing. An output shaft is attached to the yoke support shaft, the other end of which is attached to a power take-off mechanism. Electric power is connected to each of the electromagnetics and a micro switch, operated by the yoke support arm, functions to switch current on and off alternatively between said electromagnetics. The yoke reciprocates between the electromagnetics and the output shaft which is attached to the yoke support shaft operates a power take-off device. Any type of machinery may be operated from the power take-off mechanism such as a motor vehicle, farm machinery, power tools, water crafts, time keeping devices, etc.

It is one object of this invention to provide an efficient magnetic motor machine capable of operating other machinery or devices.

An other object of this invention is to support a pair of electromagnetics in spaced apart relationship on rigid supports such as the opposite walls of a housing and to position therebetween a yoke on a shaft, the opposite end of said shaft being supported on a bearing within the housing.

Another object of this invention is to connect one end of an output shaft to the yoke support shaft and to connect a power take-off device to the opposite end of said output shaft whereby mechanisms such as motor vehicles, water craft, power tools and the like may be operated from said take-off mechanism.

Yet another object of this invention is to cause the yoke to be reciprocated between the electromagnetics whereby the yoke support shaft and output shaft oscillate and reciprocate, respectively, whereby a power take-off mechanism connected to the end of the output shaft may be rotated in response to reciprocation of said output shaft.

It is still another object of this invention is to alternate current flow to the electromagnetics for energizing same alternatively and to utilize switching means for this purpose.

These and other objects of the present invention will become apparent from a consideration of the following specification when read in conjunction with the annexed drawings.

DESCRIPTION OF THE PREFERRED EMBODIMENT OF THE INVENTION

Figure 1:
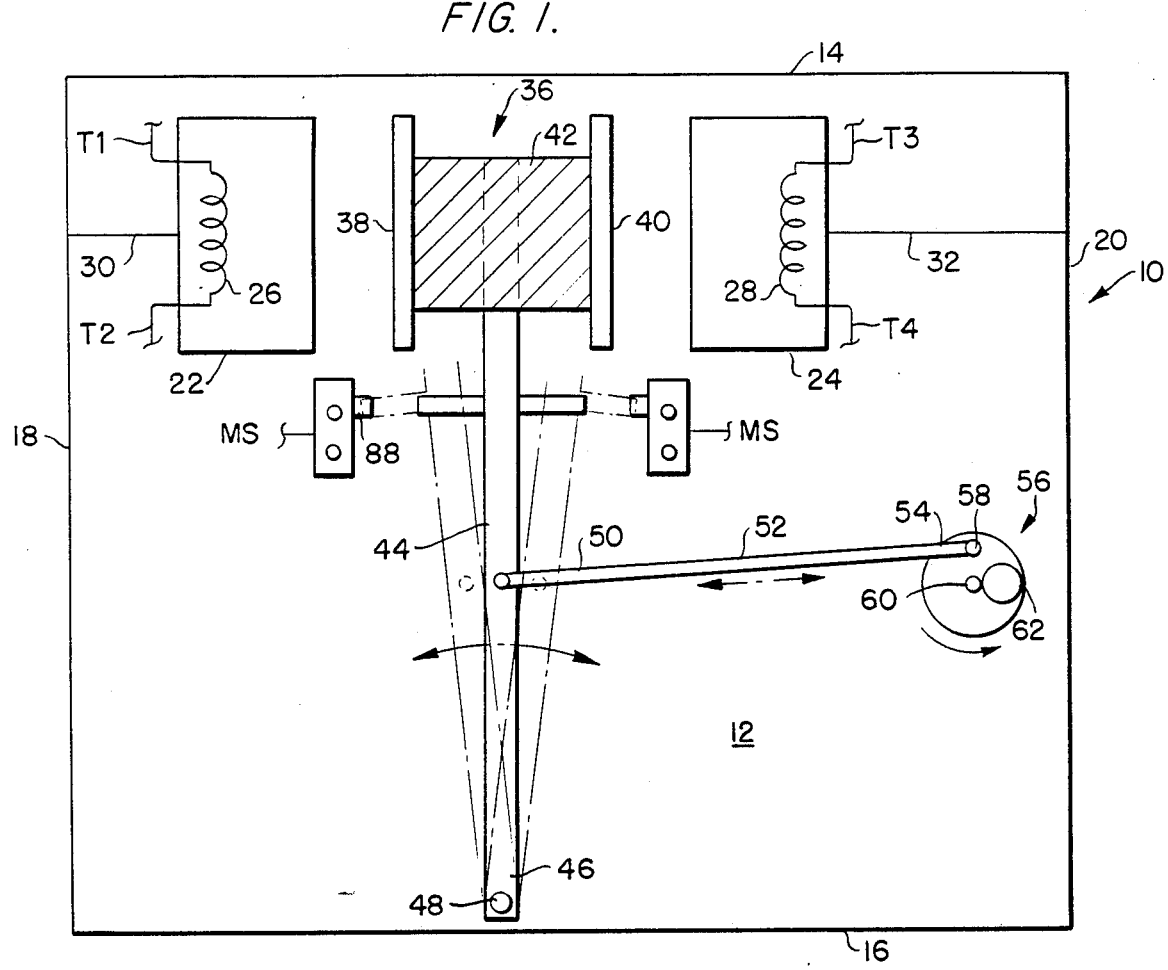
FIG. 1 is a side elevational view, in part section, of the internal parts of the electric motor machine.

Referring now to FIG. 1 of the drawing, there is shown a magnetic motor machine 10 having a housing 12 consisting of six walls of which 14, 16 are top and bottom walls, respectively, and 18, 20 are side walls. The end walls are not shown, however, they are provided to close the housing.

A pair of electromagnetics 22, 24 having electrical coils 26, 28 are rigidly attached to walls 18, 22 by any suitable braces 30, 32. It will be appreciated that braces 30, 32 are made of insulation material which serve to insulate the electromagnetics from the walls 18, 20 of the housing 12. The coils 26, 28 of the electromagnetics 22, 24 are connected to power supplies by means of suitable electrical wire attached to terminals T1, T2, T3 and T4 through a micro switch MS. This power supplies and their connections to the electromagnetics will be more fully explained below.

A yoke 36 having magnetizable faces 38, 40 separated by an insulator block 42 is supported for reciprocation movement between the electromagnetics by a support shaft 44. The end 46 of the support shaft 44 is pivotably attached to a suitable support rod 48 which functions as a bearing whereby the shaft 44 may oscillate with the least possible friction. The rod 48 may extend to the end walls (not shown) and be rigidly attached thereto. Alternatively, the rod 48 may be U-shaped and the ends of the legs rigidly attached to bottom wall 16.

One end 50 of an output shaft 52 is attached to the yoke support shaft 44 at a suitable point between the yoke 36 and end 46. The opposite end 54 of the shaft 52 is rotatably connected to a power take-off mechanism 56 by a suitable connecting rod 58 which also functions as a bearing. The power take-off mechanism is in the form of an eccentric having support means 60 which is rigidly attached to end walls and rotatably supports the eccentric 56. An offset stub shaft 62 extends from the eccentric 56 to the outside of the housing through suitable openings in the walls thereof. The distal exterior end of the shaft 62 has means thereon to facilitate connection to any type of machinery exterior of the housing.

Figure 2:
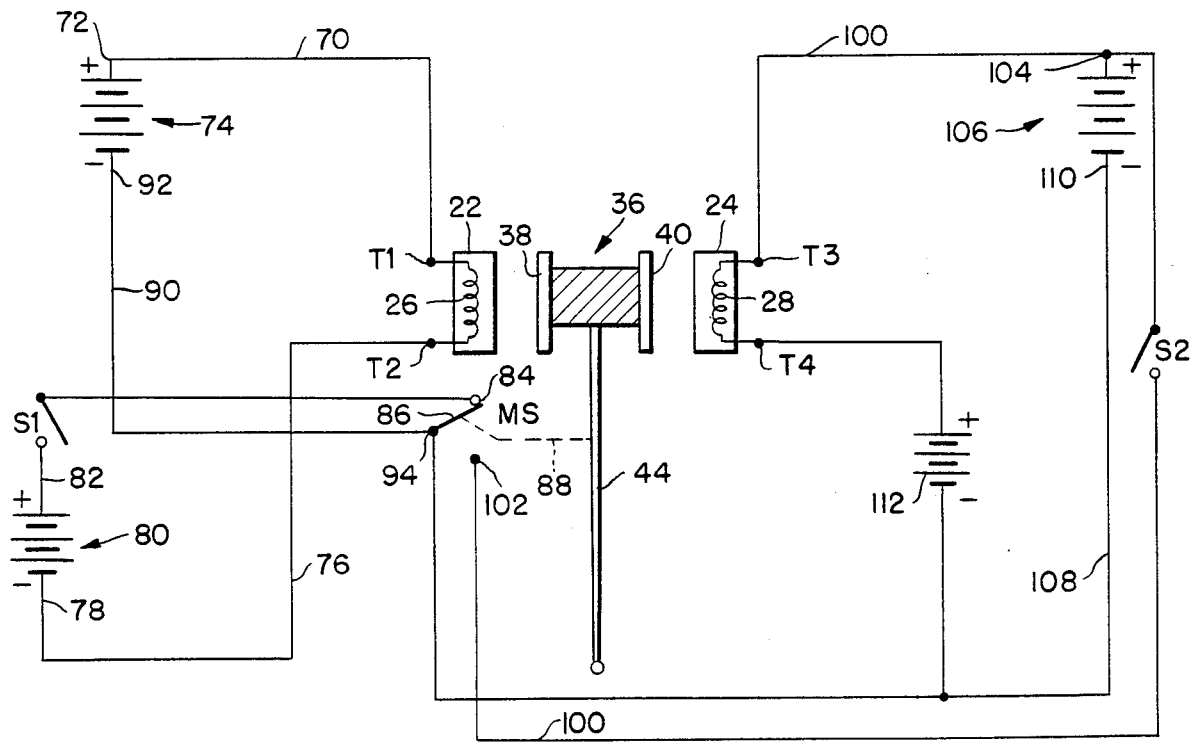
FIG. 2 is a schematic drawing of the electrical circuits whereby current is switched on and off alternatively to the electromagnetics.

FIG. 2 is a schematic diagram of the electrical circuits. The yoke 36 is shown supported on shaft 44, and positioned directly between the electromagnetics 22, 24. One end of a conductor 70 is connected to a terminal 72 of a power supply 74 and the other end of the conductor 70 is connected to terminal T1 of electromagnetic 22. One end of a conductor 76 is connected to terminal 78 of a power supply 80 and the other end is connected to T2 of electromagnetic 22. Terminal 82 of power supply 80 is connected through an on-off switch S1 to normally closed terminal 84 of a micro switch MS having a movable contact arm 86 pivotable about a common terminal 94. One end of a conductor 90 is connected to terminal 92 of power supply 74 and the opposite end of conductor 90 is connected to common terminal 94 of the micro switch MS.

One end of a conductor 100 is connected to terminal T3 of electromagnetic 24 and the opposite end is connected to normally open terminal 102 of micro switch MS through an on-off switch S2. Terminal 104 of a power supply 106 is connected to conductor 100 at a point between T3 of electromagnetic 24 and S2. One end of a conductor 108 is connected to terminal 110 of power supply 106 and the opposite end is connected to common terminal 94 of micro switch MS. A power supply 112 is connected between T4 of electromagnetic 24 and conductor 108 at a point between power supply 106 and common terminal 94 of the micro switch MS.

The micro switch MS is a spring bias device having toggle switches to break and make the circuits of electromagnetics 22, 24. As can be seen, the negative wires from each side of the power supplies are connected to common terminal 86 of micro switch MS. Further, positive wires from each of the power supplies is connected to normally closed contacts 84 and normally open contacts 102, respectively, of the micro switch MS. Both positive terminals are toggle operated to break the circuits alternatively during reciprocation of the yoke 36 and shaft 44. The micro switch MS may be placed adjacent to either of the electromagnets as seen in FIG. 1.

In operation, assume that movable contact arm 86 is in the position shown in FIG. 2 and assume that the power supplies are connected through S1, S2 to the electromagnetics 22, 24 and switches S1, S2 are simultaneously closed, current will flow from power supply 80 through conductor 76, coil 26 of electromagnetic 22, power supply 74, contact 86 and back through power supply 80 thus activating electromagnetic 22 whereby yoke 36 is rapidly attracted to the activated electromagnetic due to the metal surface 38 of yoke 36. Immediately upon contacting the electromagnetic 22, shaft 44 operates the micro switch operator 88 which functions to release contact 86 from terminal 84 thus breaking the circuit for electromagnetic 22 whereby it becomes deenergized. Immediately upon being released, movable contact arm 86 of micro switch MS is spring biased to normally open terminal 102 whereby current flows from power supply 112 through terminal 94, contact arm 86, terminal 102, conductor 100, switch S2, coil 28 of electromagnetic 24, and back through power supply 112 thus energizing coil 28 of electromagnetic which functions to rapidly attract yoke 36 due to its metal face 40. Upon moving toward electromagnetic 24, shaft 44 disengages the micro switch MS operator 88 which is spring biased back to normally closed terminal 86 thus disconnecting the circuit to electromagnet 28 and at the same time connecting the other circuit whereby current will flow in electromagnetic coil 26 rapidly attracting the yoke back to that side of the machine. This is repetitive as long as switches S1, S2 are closed and power is available to energize in an alternative fashion the electromagnetics 22, 24 as previously described.

Upon reciprocation of the yoke 36 back and forth between electromagnetics 22, 24 as previously described, shaft 44 rocks on its bearing support 48. This action is translated to output shaft 52 which results in reciprocation motion of that shaft. Since the shaft is connected to a power take-off mechanism 56, the power take-off mechanism will rotate rapidly. The output shift 62 of the power take-off device may be attached to the gear train of any type of motor, machinery or like device to operate same.

It will be readily apparent that two strokes of the yoke 36 and shaft 44 will cause the power take-off eccentric 56 to complete one revolution. Additional horsepower may be obtained by varying the ratio of lengths between shaft 44 and shaft 52. In this regard, the longer the shaft 44 in respect of the shaft 52, the more horsepower obtained.

The switching means for the various circuits may be in the form of two micro switches, one for each of the circuits of electromagnetics 22, 24 and positioned adjacent said electromagnetics to be operated by shaft 44 as the yoke 36 reciprocates between the electromagnetics.

The various parts and the housing of this magnetic motor machine are constructed from durable materials such as metal and/or plastic and the like.

Although the invention has been described in detail with respect to the preferred embodiment thereof, it is understood that the present disclosure has been made only as an example and that numerous changes in the construction thereof may be resorted to without departing from the spirit and scope of the invention claimed herein.

What I claim is:

1. A magnetic motor machine comprising:
 a housing having side walls, end walls and top and bottom walls;
 a pair of electromagnets secured in spaced apart relationship to insulating braces attached to said side walls within the housing;
 power supply means energizing each of said electromagnets;
 means associated with said power supplies for alternatively connecting said power supplies to said electromagnets whereby said electromagnets are alternatively energized;
 a yoke reciprocable between said electromagnets and comprising metallic faces having an insulation block therebetween;
 a support shaft attached at one end to said insulation block of said yoke and attached at its opposite end to a fixed bearing;
 said fixed bearing comprising a rod extending between said end walls and rigidly fixed thereto;
 an output shaft fixed at one end to said support shaft midway between the yoke and the fixed bearing, the opposite end attached to an eccentric; and
 offset stub shaft means on the eccentric extending to the exterior of the housing and rotated in response to reciprocation of said yoke and said output shaft whereby machinery external of said magnetic motor may be operated.

2. A magnetic motor machine comprising:
 a housing having side walls, end walls and top and bottom walls;
 electromagnets in spaced apart relationship attached to said side walls by insulation braces, said electromagnets having input and output terminals;
 electronic circuit means having power supplies therein connected to said input and output terminals of said electromagnets;
 microswitch means for said electronic circuits whereby said electronic circuits are alternatively connected to said electromagnets;

plural manual switching means for completing said electronic circuits;

yoke means reciprocably positioned between said electromagnets, said yoke means comprising metallic faces having an insulation block therebetween;

a support shaft fixed at one end to said insulation block of said yoke means at one end and attached at its opposite end to a fixed bearing;

said fixed bearing comprising a rod extending between said side walls of said housing and attached thereto near the bottom wall;

an output shaft fixed at one end to said support shaft midway between the yoke and the fixed bearing, the opposite end of said output shaft attached to an eccentric journaled in the walls of the housing; and offset stud shaft means on the eccentric extending to the exterior of the housing whereby machinery external of the housing may be operated upon reciprocation of the yoke, support shaft and output shaft.

* * * * *